Dec. 4, 1923.  1,476,315
I. H. WILSEY
METHOD AND APPARATUS FOR CONTROLLING INTERNAL COMBUSTION ENGINES
Filed April 29, 1920  2 Sheets-Sheet 1
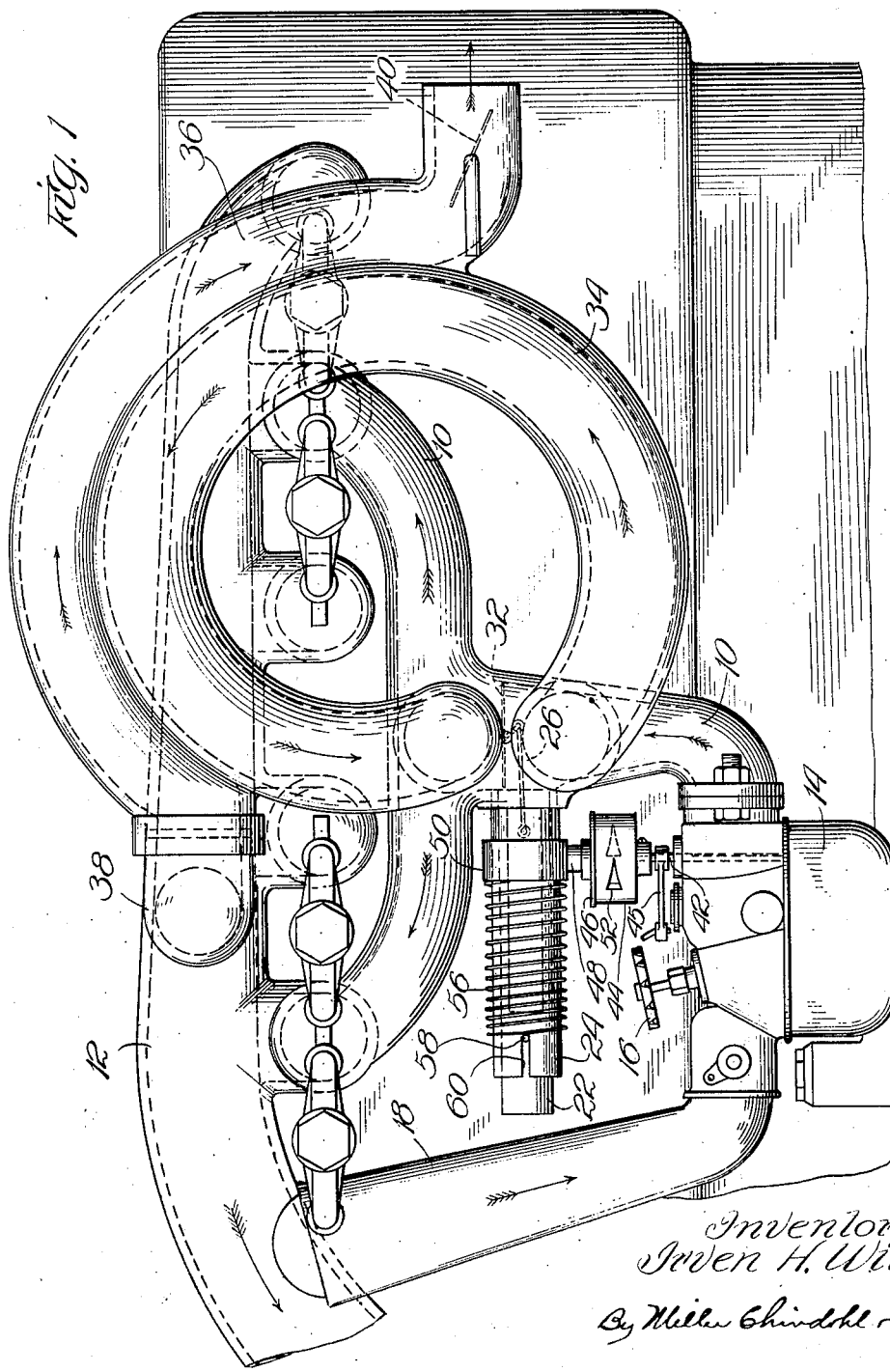
Inventor
Irven H. Wilsey

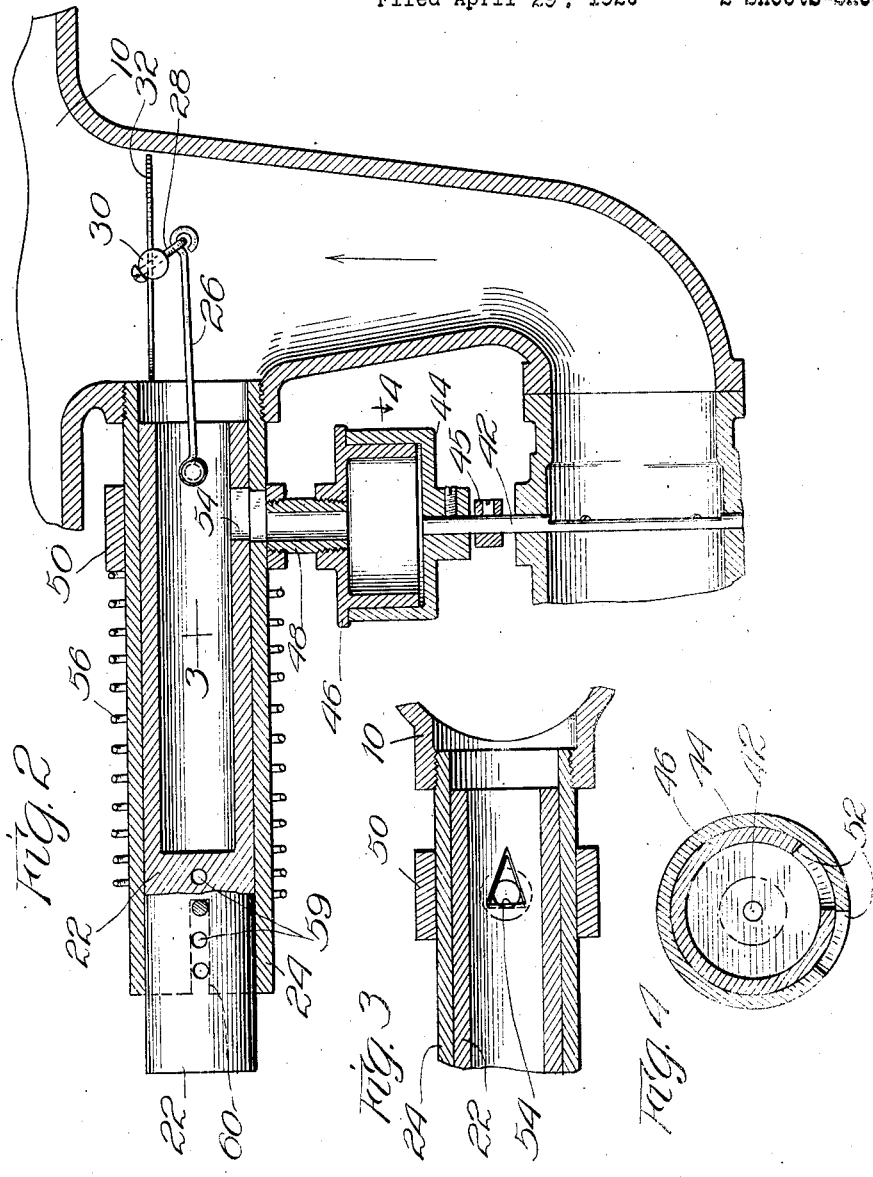

Patented Dec. 4, 1923.

1,476,315

UNITED STATES PATENT OFFICE.

IRVEN H. WILSEY, OF CHICAGO, ILLINOIS, ASSIGNOR, BY MESNE ASSIGNMENTS, TO WILSEY INCORPORATED, A CORPORATION OF DELAWARE.

METHOD AND APPARATUS FOR CONTROLLING INTERNAL-COMBUSTION ENGINES.

Application filed April 29, 1920. Serial No. 377,455.

*To all whom it may concern:*

Be it known that I, IRVEN H. WILSEY, a citizen of the United States, residing at Chicago, in the county of Cook and State of Illinois, have invented certain new and useful Improvements in Methods and Apparatus for Controlling Internal-Combustion Engines, of which the following is a specification.

My invention relates to the operation of internal combustion engines and more specifically to an improved method for controlling such engines especially when subjected to widely varying loads and operated over wide ranges of speed.

One object of my invention is to control the latent energy per unit of volume of the explosive mixture in proper relation to the load demand and the speed, and the resulting fuel requirements of the motor.

Stated in another way the object is to attain the absolute maximum of economy in fuel supply.

The condition which I refer to as an absolute maximum is not a degree of accomplishment but a definite condition or requirement depending upon the motor with which the control is associated. It is possible for any type of motor operating under given conditions to determine the most economical mixture both as to temperature and richness, and the condition for maximum economy is simply that at all speeds and all loads the motor should receive the predetermined mixture known to give maximum motor efficiency at that particular speed and load. From the point of view of the control therefore the absolute maximum of economy merely means complete adaptation to the needs of the particular motor throughout its entire range of speeds and loads.

An understanding of the fuel demands resulting from various load and speed conditions in the common types of internal combustion engines will assist in an understanding of the problem involved.

The ordinary Otto cycle engine operates under conditions which may be divided into four typical cases.

First. Idling, or operation at a slow speed with little or no load. For the idling range the mixture should be both rich and hot and slow speed is obtained by admitting only a small quantity of this mixture to the cylinder.

Second. The maximum load condition obtained in accelerating a car from slow speed or in climbing a steep incline. This condition represents perhaps the heaviest load to which the motor is ever subjected and for practical purposes fuel economy in the motor must be sacrificed to the power requirement. For operation under such conditions the proper mixture is one that is very rich and as cold as possible, so that the weight of mixture taken in by each suction stroke and the proportion of fuel in the mixture will both be at the maximum.

Third. The almost equally heavily loaded condition obtained in driving at very high speeds. This differs from the second condition only in the high speed of the motor. The mixture should be practically the same as under the second set of conditions.

Fourth. The operation at moderate speeds and moderate loads. This range of operation covers a large percentage of the use made of internal combustion engines and motor economy in the use of fuel is not only very important on this account but fortunately rather easy to obtain with a proper mixture. The mixture required is a relatively lean mixture which should also be fairly hot.

The various conditions of operation therefore will be seen to require rich hot mixtures, lean hot mixtures and rich cold mixtures, and these requirements are so conditioned with respect to speed and load that no control method which proportions either richness or temperature according to either speed or load can attain all of them at the proper times.

According to my invention I make the temperature a function of the vacuum in the inlet manifold, which vacuum in turn is a function of both the speed and the throttle opening; and I make the richness a compound function of the throttle opening and of the vacuum in the inlet passages, which, as has been already stated, depends itself on the throttle opening and also on the speed. I am, moreover, able to vary the effect of both the throttle opening and the vacuum in the inlet manifold upon the richness, making both conditions effective in any irregular manner desired so as to adapt my improved control system with great precision to the exact requirements of each individual unit with which it is to be associated, the unit comprising not only the internal combustion engine but the automobile, motor boat or other complete device associated with the engine.

In the accompanying drawing, Figure 1 is a side view of an internal combustion engine of a common type illustrating the application of apparatus suitable for the practice of my improved method thereto. Fig. 2 is an enlarged section through the control mechanism associated with the inlet manifold and throttle. Figs. 3 and 4 are detail sections on the lines 3—3 and 4—4 of Fig. 2.

Referring to the apparatus selected for illustration, the internal combustion engine receives fuel through the inlet manifold 10 and discharges the burnt gases to the exhaust manifold 12. The usual carburetor 14 having an adjusting needle valve controlled by the hand wheel 16 and a throttle of any desired design, receives air through an inlet pipe 18 which draws free air from around a portion of the exhaust manifold. The design is such that the heating of the air coming into the carburetor is sufficient to enable the air to properly take up its charge of fuel in the carburetor. The well known cooling effect due to volatilization of fuel in the carburetor may be assumed practically to neutralize this initial heating so that a mixture of constant richness, 12 to 1 for instance, is delivered to the inlet manifold at practically atmospheric temperature.

To vary the heating of the incoming mixture in proportion to the vacuum in the inlet manifold, I provide a horizontal plunger 22 reciprocating in a suitable sleeve 24, and connected by a link 26 to a crank arm 28 for rotating the shaft 30 carrying a butterfly valve 32. The valve in the position illustrated in the drawings completely blocks the main direct path through which the mixture would normally flow to the upper portion of the inlet manifold forcing it to flow around a coil of metal tube 34 in order to pass the obstacle thus imposed. Any suitable means may be employed for heating the tube 34. I have illustrated convenient and economical means for doing this in the nature of a second tube 36 formed integral with the inlet tube 34 and connected at 38 to the exhaust manifold. An adjustable butterfly valve 40 at the end of the pipe 36 limits the amount of hot gases taken by the pipe.

The carburetor illustrated is designed to give a mixture of constant richness at all speeds and the richness of the mixture fed to the engine is controlled by diluting the same in the inlet manifold. For this purpose, the throttle stem 42 carries a cup shaped member 44 at its upper end above the control crank 45 which receives an inverted cup shaped member 46 stationarily supported by a short connector tube 48 tapped into a ring 50 on the sleeve 24. Irregular slots 52 adapted to be moved into and out of register are cut in the cups 44 and 46, and similar irregular slots 54 are cut in the wall of the sleeve 24 and in the plunger 22. As illustrated, these slots are approximately V-shaped but it will be apparent hereinafter that their shape may be varied for a definite and advantageous purpose.

A spring 56 encircling the sleeve 24 and abutting at one end against the ring 50 and at the other end against a pin 58 carried by the plunger 22 and projecting through suitable slots 60 in the sleeve 24 normally tends to hold the valve 32 which I shall hereinafter refer to as the by-pass valve in open position, allowing the incoming gas to pass directly to the engine without going through the heater. The slots 52 in the cup shaped members are arranged to come into complete register upon opening the throttle to its fullest extent and with the throttle almost completely closed, for instance when the engine is idling, they are completely out of register. The slots 54 in the sleeve 24 and the plunger 22 are in approximately exact register when the by-pass valve 32 is completely closed, and move out of register as the by-pass valve opens.

The method of operation of the above device by means of which I automatically obtain a variation in the handling of the fuel so as to comply with all of the requirements above pointed out will now be explained.

Suppose first that the engine is idling, which is the condition illustrated in Fig. 2. The throttle being almost completely closed, the engine even at its slow speed maintains a high vacuum in the inlet manifold or to be more accurate, the throttle by maintaining a high vacuum in the inlet manifold limits the weight of mixture taken in by each cylinder on the suction stroke. The vacuum being high, the plunger 22 is, as illustrated, moved to completely close the by-pass valve so that all the mixture supplied will be heated. The slots 54 in the sleeve and plunger are in exact register but inasmuch as the throttle is practically closed and the slots 52 in the cups are completely out of register, no dilution of the mixture occurs. A very hot and very rich mixture is thus delivered in small quantities to the engine.

Suppose next that the throttle is thrown wide open to accelerate the car quickly or to climb a steep incline. The fuel supply should be both cold and rich. Throwing open the throttle will bring the slots 52 in the cups into register but the immediate relief of the vacuum in the inlet manifold will allow plunger 22 to move out, cutting off the supply of air for dilution and also opening the by-pass valve so that the mixture coming from the carburetor is delivered directly to the engine. The cold rich mixture required is thus delivered.

Suppose next that the throttle is left wide open and the car is driven at extreme speeds for racing purposes. With properly designed inlet passages the vacuum near the butterfly valve will never be sufficient while the throttle is wide open to actuate the plunger, which would bring the slots into register allowing dilution of the mixture and also by-pass a portion of the mixture to heat it. The cold rich mixture can therefore be supplied at all speeds if the power requirement is so heavy that the throttle is left wide open.

Suppose, however, that after accelerating the car to thirty miles an hour it is to be driven at a constant speed without further acceleration. It will be necessary as soon as the proper speed is attained to partially close the throttle to prevent further acceleration. This will develop a partial vacuum in the inlet manifold partially closing the by-pass valve and heating part of the mixture. The movement of the plunger 22 will also partially open the passageway through slots 54 and in the intermediate positions of the throttle the slots 52 in the cups will also be partially open. Additional air therefore flows into the cups and through the connector and plunger to dilute the mixture. This is the fourth condition of moderate load and moderate speed and it will be apparent that the mixture is both diluted and heated giving the hot lean mixture necessary to attain maximum fuel economy.

In adjusting a control system according to my improved method to a particular make of car a mechanism substantially as shown in the drawings is assembled on the engine and the entire unit whether it be a touring car or a tractor with a train of trailers hitched behind it, is driven over standardized roadways at various speeds and loads. At each speed and load the chemical composition of the exhaust gases coming from the engine is suitably determined as for instance by using an Orsat apparatus as well as the performance and controllability of the motor, and the positions of the throttle valve and plunger corresponding to the various speeds and loads may be readily recorded. From the observed performance at each speed and the known maximum efficiency and corresponding mixture for the motor under the given speed and load conditions, corrections may then be readily determined for each different condition and the shape of the slots in the cups and in the plunger and sleeve may be varied to secure the precise mixture which the engine requires. It will be seen that such adjustment automatically secures complete adaptation, not to any theoretical performance curve computed on paper by the designers of the power plant, but to the actual performance characteristics of the entire unit including power plant, rear transmission, tires, wind resistance, and even the road. Obviously, after proper calibration of the apparatus my improved method may be immediately put into use on all similar units. Control systems according to my invention have been put into service, tested, calibrated and retested, and are effectively demonstrating their superiority in fuel consumption and automatic adaptability to rapid changes in load conditions.

While I have illustrated and described in detail the preferred embodiment of my invention, it should be clearly understood that the disclosure is merely for purposes of illustration and that many modifications and variations will naturally occur to those skilled in the art. It will, for instance, be obvious that the heating of the hot lean mixture supplied at moderate speeds and loads may be accomplished by heating only the air employed for dilution of the mixture to a very high temperature instead of heating the entire mixture to a moderate temperature and that the heated air for dilution may readily be injected into the fuel just before it enters the cylinder. This would provide a much more instantaneous response of the control system to a change in motor requirement. I aim in the subjoined claims to cover all such legitimate variations and modifications.

I claim as my invention:

1. The method of controlling the fuel supply to an internal combustion engine comprising varying the temperature and density as functions of the vacuum controlled temperature in the inlet passages and varying the richness as a function of both the vacuum and the throttle opening.

2. The method of controlling the mixture supplied to an internal combustion engine comprising varying the temperature of the mixture supplied as a function of the vacuum in the inlet passages and varying the richness of the mixture as an inverse function of the vacuum and a direct function of the throttle opening.

3. In combination with the inlet and exhaust passages of an internal combustion engine, a carburetor adapted to deliver a substantially uniform mixture, means controlled by the vacuum in the inlet passages for heating the mixture and means controlled by movement of the throttle and by the vacuum in the inlet passages for diluting the mixture.

4. In combination with inlet and exhaust passages of an internal combustion engine, a heater warmed by the exhaust gases, means controlled by the vacuum in the inlet passage for passing a portion of the mixture through said heater, the portion passed through depending upon and increasing with the vacuum in the inlet passages, and a plurality of means associated in series for diluting the mixture, one diluting means tending to increase the dilution with increase of vacuum and the other means tending to decrease the dilution as the throttle is closed.

5. The combination with an internal combustion engine having an intake manifold and an associated carburetor, of a by-pass communicating with said manifold, means for heating said by-pass, a valve arranged to control the flow of fuel directly through said manifold or around said by-pass, means operated by the vacuum in the manifold for controlling the position of said valve, and means for introducing additional air into the manifold to dilute the fuel mixture.

6. An internal combustion engine having an intake manifold and an associated carburetor, in combination with a heated by-pass communicating at both ends with said manifold, a valve arranged to control the flow of fuel directly through said manifold or around said by-pass, means controlled by the suction in the manifold for determining the position of said valve, a main throttle valve in said manifold, and means governed by the position of said main throttle valve for admitting varying quantities of air into the manifold to dilute the mixture.

7. The method of selectively passing a homogeneous mixture through heated or unheated intake paths and automatically diluting the portion passing through the heated path according to the load and speed conditions of the motor.

8. The combination with an internal combustion engine having an intake manifold and an associated carburetor, of an auxiliary air inlet passage, a vacuum controlled valve in said passage, and an inlet valve in said passage mechanically connected to the main throttle and arranged coaxially therewith.

9. In combination with an internal combustion engine having inlet openings, a special inlet manifold fitting said opening and having intermediate openings adapted to communicate with a by-pass, a valve between said intermediate openings adapted to force the mixture to flow thru the by-pass, and automatic means operated by the vacuum in the inlet passages for controlling said valve.

10. In combination with the inlet passages of an internal combustion engine, a heated by-pass, a valve for regulating the portion of the incoming fuel passing through said by-pass, a hollow plunger actuated by the vacuum in the inlet passages for controlling said valve, a sleeve supporting said plunger, and ports in said plunger and sleeve adapted to admit air for diluting the mixture.

11. In combination with the inlet passages of an internal combustion engine, a heated by-pass, a valve for regulating the portion of the incoming fuel passing through said by-pass, a hollow plunger actuated by the vacuum in the inlet passages for controlling said valve, a sleeve slidably supporting said plunger, ports in said plunger and sleeve adapted to admit air for diluting the mixture, and means mechanically connected with the throttle for controlling the supply of air to said ports.

12. In combination with the inlet passages of an internal combustion engine, a heated by-pass, a valve for regulating the portion of the incoming fuel passing through said by-pass, a hollow plunger actuated by the vacuum in the inlet passages for controlling said valve, a sleeve slidably supporting said plunger, ports in said plunger and sleeve adapted to admit air for diluting the mixture, resilient means controlling the movement of said plunger and quickly adjustable means for varying the tension of said resilient means.

13. In an internal combustion engine having inlet passages, a device of the class described having a tube, a resiliently held plunger inside the tube, ports in said plunger and tube, and means for moving said ports into register in proportion to the vacuum in the inlet passages to permit air to flow thru said plunger.

14. In a device of the class described, a carburetor having a rotatable throttle, a tube having its axis coincident with the axis of the throttle, a rotatable sleeve on said tube, means for rotating the sleeve and the throttle simultaneously, and ports in the sleeve and in the tube adapted to be moved into register as the throttle opens.

In testimony whereof, I have hereunto set my hand.

IRVEN H. WILSEY.